July 3, 1934.    K. CONNELL    1,965,333
FLOW GAUGE
Filed May 1, 1930    3 Sheets-Sheet 1

INVENTOR.
Karl Connell
BY
F. P. Warfield
ATTORNEY

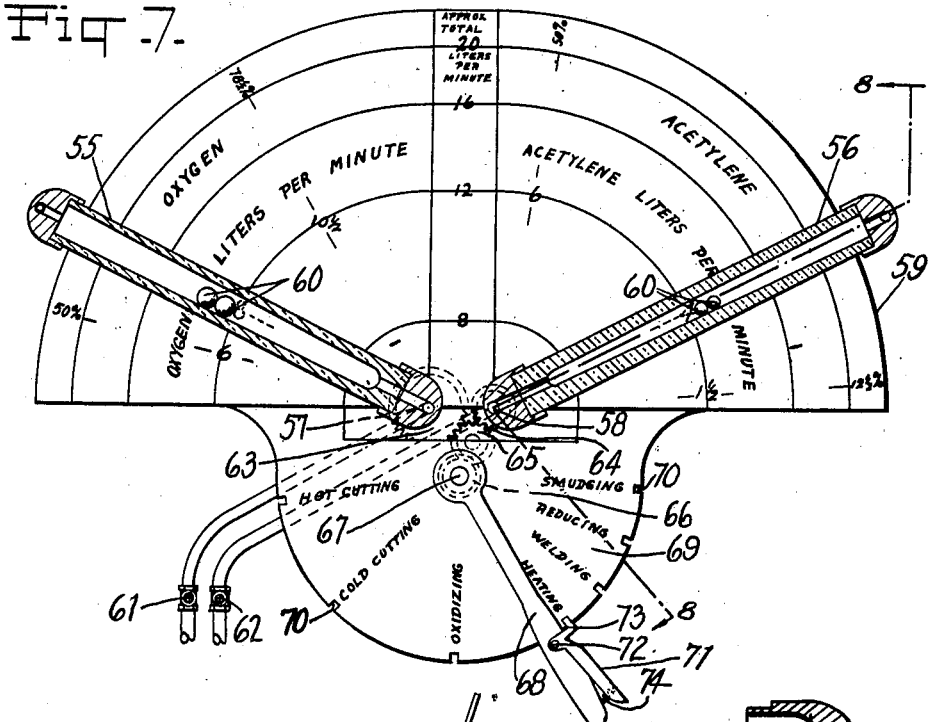
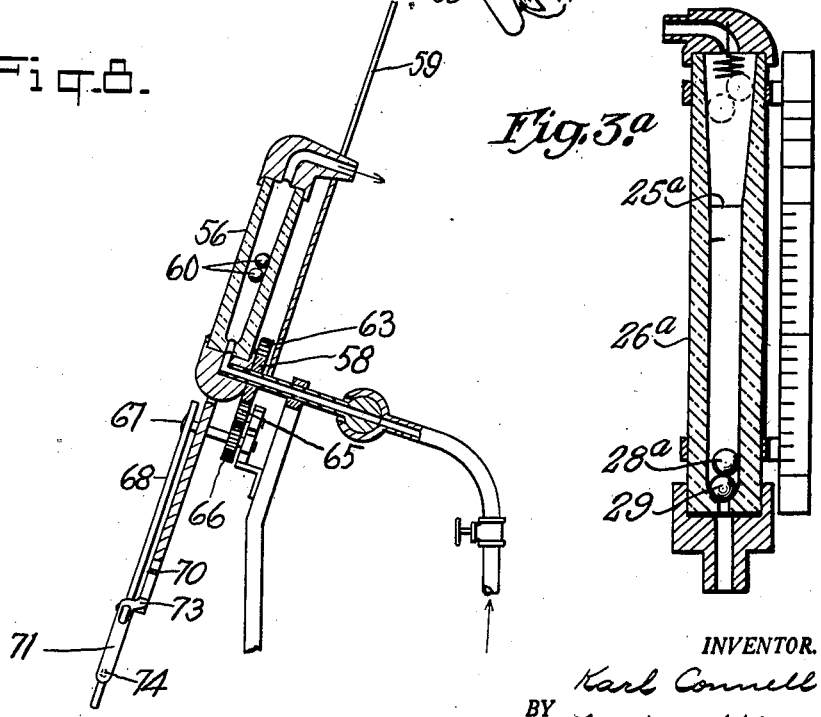
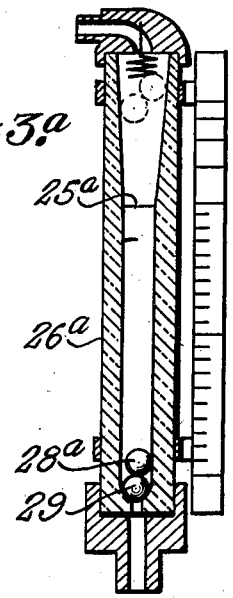

Patented July 3, 1934

1,965,333

UNITED STATES PATENT OFFICE 1,965,333

FLOW GAUGE

Karl Connell, Branch, N. Y.

Application May 1, 1930, Serial No. 448,860

20 Claims. (Cl. 73—167)

This invention relates to flow-gauges.

In general it is an object of the invention to provide a flow-gauge which is particularly accurate in operation, which is simple in construction, which is adaptable to a large variety of uses, and which will efficiently accomplish the purposes for which it is intended.

Another object is to provide an improved type of flow-gauge wherein variations in reading, due to oscillation of a freely movable member, is avoided.

Another object is to provide an improved type of flow-gauge which is readily adapted for use under varying operating conditions.

Another object is to provide an improved type of flow-gauge adapted for use in the ready indication of the flow of gases.

Another object is to provide a flow-gauge which is readily adapted for use in indicating the relative flow of different gases which are to be used together.

Another object is to provide a flow-gauge adapted for the ready indication of minute variations in flow, and at the same time adapted for the indication of wide variations of flow without unduly lengthening the gauge tube.

Another object is directed to the provision of means to limit the upward movement of an indicating element in a tube to absorb the impact thereof.

Another object is to facilitate the reading of a scale on a gauge.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of the invention reference should be had to the following detailed description taken in connection with the accompanying drawings, in which:

Fig. 3a is a vertical section illustrating a further modification;

Fig. 7 is a view illustrating a modified form of flow-gauge construction for use in indicating the flow of a plurality of gases; and Fig. 8 is a sectional view along the line 8—8 in Fig. 7.

In a flow-gauge it is desirable, both for the sake of simplicity of construction, long life and accuracy of operation at all times, that the indicating member be a freely movable element such, for example, as a ball, the diameter of which is sufficiently small to permit the fluid to flow about the same, and which is lifted by the flowing fluid to a position depending upon the speed of flow, it being appreciated that where such a member is not freely movable an element of friction comes into play, which not only causes wear, but which renders the device relatively unreliable. Even in cases, however, where a freely movable element (which term will be hereinafter expressed by the word "ball," for the sake of facility of expression) is utilized in a properly proportioned tube, considerable variations in reading have been found to result because of the tendency of the ball to oscillate between the middle and side of the tube, it being evident that when the pattern of the orifice is changed from one resembling an annulus to one resembling a crescent, as a result either of occasional or rythmical lateral oscillation of the ball, inaccuracies in reading will result. This tendency is particularly undesirable in the case of tubes, the bore of which increases in diameter throughout its length, so as to render the indications of a ball in such a tube especially unreliable toward the upper end of the range of operation of the tube, where, in many cases, a particularly accurate reading is especially necessary.

With these and other ends in view, the present invention contemplates the provision of a construction, which, without giving up the advantages inherent in the use of prior tubes, permits a particularly accurate reading to be obtained under all conditions.

Figure 1:
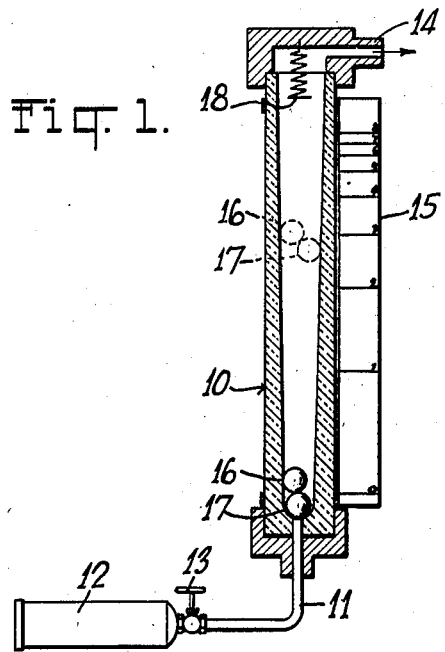
Figure 1 is a vertical section of a flow-gauge embodying the invention.

One form of gauge embodying the invention is exemplified in Fig. 1, wherein a gauge tube 10 having upwardly and outwardly inclined inner walls is suitably connected as by means of an inlet conduit 11 with a suitable source of fluid such, for example, as compressed gas in a container 12. A suitable decompression or control valve such as the valve 13 may be provided between the container and the tube. At its upper end the tube is provided with an outlet 14. The tube itself may be suitably formed to permit an observer of a view thereof throughout its length and is ordinarily composed of transparent material, such as glass, or, preferably, a transparent, relatively unbreakable or shatter-resistant, material, such as a transparent condensation product. Either on the tube itself, or adjacent its outer walls, there is provided a suitable scale, such as indicated at 15, and within the tube there are provided suitable means which are actuated by the flowing gases to indicate the extent of the flow. In the present instance, this means consists of a pair of balls 16 and 17, it being apparent that as indicated in dotted lines in the figure these balls will cooperate to press each other against the opposite sides of the tube to provide indicating means of such nature that the indicating means always obstructs the flow of gas to a given extent for any given position of the balls. In other words, each ball holds the other ball against the side wall of the tube so as to prevent either of the balls from oscillating and varying the pattern presented in opposition to the flow of gas. Accordingly, the path of flow for the gases about the balls when the latter are at any given point will always be the same, since the balls will at all times be in position against opposite walls of the tube; and the passageway for gas-flow about each ball will be crescentic at all times. It is to be borne in mind in this connection that an obstruction placed in the center of an orifice will offer greater resistance to gas flow than the same obstruction placed against the side of the orifice, since the frictional resistance will be greater in the former case than in the latter.

Furthermore, the provision of a plurality of balls which obstruct the passageway each progressively less in the direction of gas flow provides a damper for oscillation of the indicating means longitudinally of the tube, since the lifting power of the gas will exert its maximum effect upon the lowermost of the balls. Accordingly, irregularities in the lifting effect will be dampened by the higher ball or balls; whereas, when one ball is used any irregular lifting effect will exert an undampened upward push on the single ball. Inasmuch as in a number of devices of the character under consideration the flow of gas is not constant, but is made up of a series of surges; it is often important that oscillation longitudinally of the tube be reduced to a point where the indicating means is sufficiently steady for each reading.

It has been found desirable to halt the movement of the balls before they approach the outlet to the tube, and at the same time to avoid the provision of a hard surface from which the balls will bounce. To this end there is provided cushioning means, exemplified by the spring 18, at the top of the tube.

In many cases, and particularly in the case of a tube which is to be used by an observer whose eye is not thoroughly trained in the use of an indicator employing a plurality of balls, it is desirable to avoid the necessity of using more than one ball or other freely movable indicating means, and it is also desirable, in certain instances, to utilize a tube which does not depend upon the use of an auxiliary indicating element to hold the ball against the side of the tube.

Figure 2:
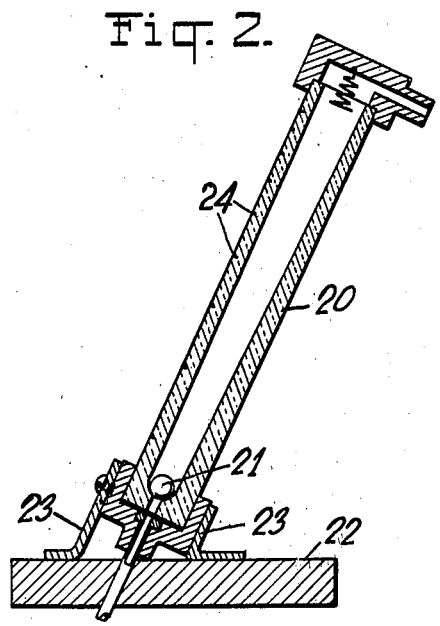
Fig. 2 is a vertical section of a modified form of a flow-gauge embodying the invention.

The invention, in certain of its aspects, accordingly contemplates the provision of mounting means adapted for positioning the tube on an angle oblique to the vertical, whereby a ball will be held by gravity against one side of the tube, and whereby a scale extending lengthwise of the tube may be read from above. One such construction is shown in Fig. 2, in which a tube 20 containing a ball 21 is mounted upon a suitable support 22 by means of braces 23 which are arranged to hold the tube in an inclined position when the support 22 is horizontal, and to serve as means for assuring that the ball 21 will be maintained during its movement against the wall of the tube instead of being permitted to oscillate in the tube with a consequent variation in the pattern of the orifice and in the flow of the gas. The channel for flow of gas past the ball will at all times be in the shape of a crescent rather than in the shape of an annulus. A scale 24 is suitably provided, as upon the side of the tube, the calibration being, of course, suitably conformed to the angle of inclination of the tube. It is to be noted that by disposing the tube at an angle oblique to the horizontal, the reading of the scale formed on the tube, as indicated in Fig. 2, or mounted along-side the tube, as indicated in Fig. 1, is greatly facilitated when the scale is disposed beneath the eye of the observer, as will ordinarily be the case.

Figure 3:
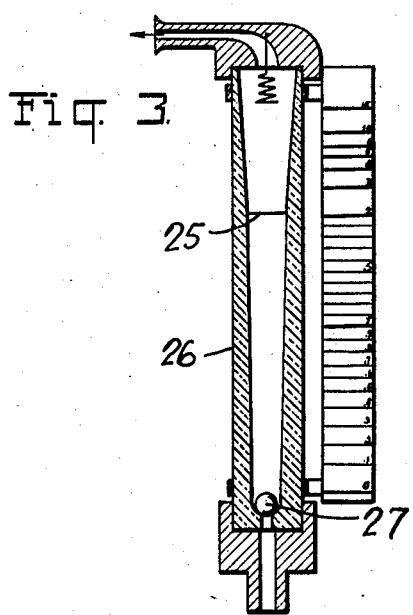
Fig. 3 is a vertical section illustrating still another modification.

In certain instances it is desirable that the gauge indicate relatively minute changes in flow over a given length, and also indicate less minutely changes in flow over a relatively wide range. Such an arrangement is of particular use in indicating the flow of gases in resuscitation work, for example. In order to accomplish this purpose without unduly extending the tube longitudinally, there may be provided a construction such as exemplified in Fig. 3, wherein the diameter of the bore of the tube increases relatively slowly from its lower portion to the point 25 on the tube 26 and relatively rapidly, as indicated above the point 25 on this tube. One or more balls, such as the ball 27, may be provided. One such form of construction is shown in Fig. 3a. A pair of balls 28 and 29 are provided in this instance in a tube 26a. As will be seen the bore of the tube 26a increases relatively slowly from its lower portion to the point 25a and relatively rapidly from the point 25a to its upper portion.

Claims specific to subject matter such as exemplified in Figs. 3 and 3a are included in my co-pending application Serial No. 712,131, filed February 20, 1934, which is a continuation-in-part of the present case.

Figure 4:
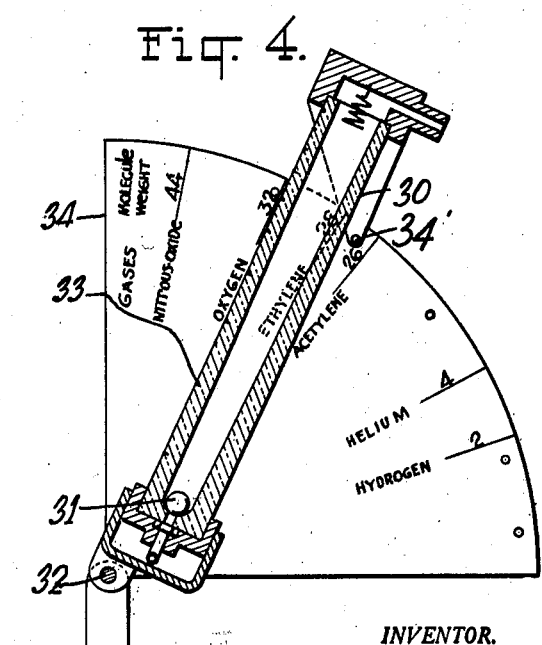
Fig. 4 is a vertical section of a flow-gauge embodying the invention, and particularly adapted for use in indicating the modified form of flow of gases of different weight.

It is often desirable to use a single flow-gauge to measure gases having different densities or the same gas at relatively wide differences of temperatures. It will be apparent that in the use of such a gauge a scale calibrated in specific units cannot be used, since a calibration which is proper for one gas will be improper for a heavier or a lighter gas, and it is thus necessary to resort to an arbitrary calibration, and thereafter to calculate the speed for the readings on such a calibration. To avoid this difficulty, the invention contemplates the use of a gauge which is arranged to take advantage of the fact when the tube is tipped toward the horizontal the ball will be raised by a given gas pressure to a point nearer the top of the tube than is the case when the tube is inclined more nearly to the vertical. One such construction is shown in Fig. 4, wherein there is employed a pivotally mounted tube 30 which may contain longitudinally movable indicating means of any desired type, such as one or more balls 31, and which may be pivotally mounted adjacent its lower end as on a pivot pin 32. The tube is provided with suitable standard calibrations 33 and is arranged adjacent a segmental scale 34, which is marked by radii corresponding to the position of one edge of the tube for rendering calibrations 33 accurate with respect to a given gas to be measured, the scale preferably being marked, as indicated, with the name of the gas adjacent such radii and, if desired, with the molecular weight of the gas, the names of gases of lower molecular weight appearing, of course, nearer the horizontal edge of the segment 34. Suitable means, such as the removable pin 34', may be provided to maintain the tube in an adjusted position. Thus the gauge may, without any change other than in angle of inclination, be utilized in measuring the flow of a number of widely different gases without the necessity of performing any calculations in connection with the determination of the speed of flow. It is to be observed, moreover, that, in the exemplified construction, the marking for the heaviest gas to be measured by the gauge is at a sufficient angle to the vertical to assure that the ball 31 will ride along the wall of the gauge tube in all cases and provide an orifice the pattern of which corresponds to a crescent, and will not oscillate laterally of the tube, and also at a sufficient angle so that the calibrations 33 can be read from a point higher than the position of the indicating means. Thus the form of gauge exemplified in Fig. 4 possesses not only the advantage of ready use in the measuring of the speed of flow of varying gases, but certain of the advantages of a construction such as shown in Fig. 2.

By so mounting the gauge tube as to permit the inclination thereof to be varied for use of the tube under different conditions, a wide field for the use of flow-gauges of the type under consideration is opened up.

The invention contemplates, furthermore, the provision of means for gauging the flow of a plurality of gases which are adapted to be utilized together, an example of such use being the gauging of the flow of oxygen and acetylene to be used in oxy-acetylene work wherein the ratio of acetylene to oxygen varies in accordance with the particular purpose for which the gases are to be used. For example, in hot cutting by an oxy-acetylene flame the ratio of oxygen to acetylene should be relatively high, whereas for smudging the ratio of oxygen to acetylene should be relatively low.

Figure 5:
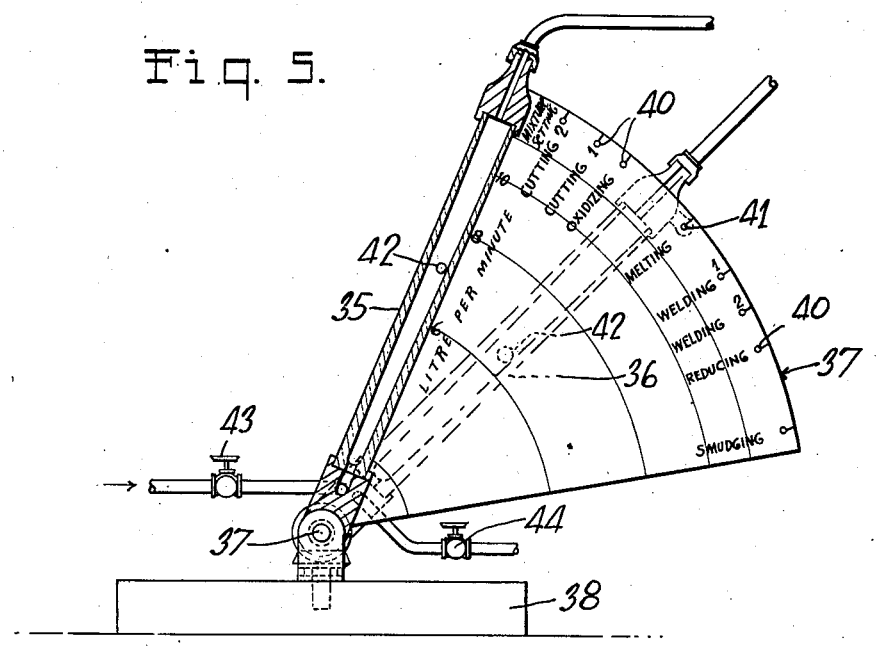
Fig. 5 is a vertical section of a modified form of flow gauge construction adapted for use in the indication of the flow of a plurality of gases intended to be used in conjunction with one another.
Figure 6:
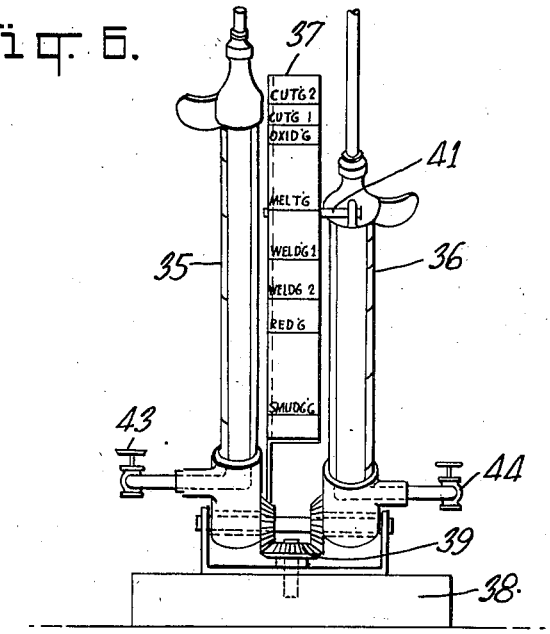
Fig. 6 is a side view of the form of construction illustrated in Fig. 5.

One form of appartaus embodying the invention, and particularly adapted for use in oxyacetylene work is exemplified in Figs. 5 and 6. In this exemplification a pair of tubes 35 and 36 are mounted on opposite sides of a segmental member 37, either the segmental member or the tubes, or, preferably, and as exemplified, both, being formed with calibrations such as will indicate relative percentages of oxygen and acetylene flowing in the respective tubes as the tubes are swung on the axis of the segment. The tubes are pivotally mounted for swinging on this axis by the pivot pin 37 held on a suitable support 38 on which the segment is fixedly held, and the tubes are connected one to another by a suitable coupling, such as gearing 39, so that one tube will move upwardly as the other is moved downwardly along the segment.

While, for the sake of simplicity of illustration, there is exemplified a gear ratio wherein the movement of one tube varies linearly with respect to the other, it will be understood that in cases where a more accurate adjustment is desired an accurately proportioned gear ratio may be readily employed.

The segment is marked, preferably both at its sides and on its arcuate upper surface, to indicate the proper position of one of the tubes for cutting, welding, reducing, smudging, etc., if the device is to be used in oxy-acetylene work, for example, or it may be otherwise marked. Preferably, there are provided suitable means, such as the holes 40 and a pin 41 for retaining one of the tubes in the position to which it is moved, it being apparent that the other tube will be held in position by means of the gearing 39. The tubes are each provided with a central channel, the walls of which may be tapered as exemplified, or otherwise suitably constructed, and any desired type of longitudinally movable indicating element such as the single ball 42, exemplified, may be employed therein.

It will be apparent that by the use of a suitably arranged scale and suitable coupling means, the relative position of the tubes can be so regulated that when the ball in each tube is the same distance from the bottom of the tube, measured longitudinally along the tube, the proper amounts of gas for the desired use will be flowing through the tubes. It is accordingly only necessary in using the exemplified construction to move one of the tubes, in the present instance 36, to a position corresponding to the designation on the segment corresponding to the type of mixture desired, to insert the pin 41 to hold the tubes in place, and thereupon to adjust the regulating valves such as indicated at 43 and 44 in the inlet connections of the tubes so that the ball in each tube will rise to a given indication.

Another form of gauge particularly adapted for use in oxyacetylene work is exemplified in Figs. 7 and 8. This device permits the worker to view the same from the side and at a point higher than the position of the indicator, and to perform the adjusting operation with the minimum of effort. It likewise embodies a gear arrangement of a type which may be used to control the relative movement of the two tubes differentially. In this construction a pair of tubes 55 and 56 are mounted on pivot pins 57 and 58, respectively, and are disposed on one side of a semi-circular scale 59 which is marked to indicate liters per minute of flow of a mixture resulting from the bringing together of the flow of the two tubes. There may be provided suitable longitudinally movable indicating means, such as the balls 60, a pair of which are utilized in each tube in the exemplified apparatus. By the use of a plurality of balls any tendency of the balls to oscillate longitudinally of the tube is materially reduced. The inlet to each tube is provided with a suitable regulating valve as indicated at 61 and 62, respectively. The relative cross-sectional area of the channels of the tubes may be suitably formed to permit a desired relative flow when the tubes are mounted at a desired mean angular position; and there may be provided suitable means for operatively connecting the tubes, and suitable indications on the scale to facilitate the reading thereof.

Carried by the pivot pins 57 and 58 are gear wheels 63 and 64, respectively. These wheels are connected in the exemplified construction by an idler 65 operated by a gear 66 mounted on a shaft 67 carrying a lever 68, this lever being movable along an arcuate scale 69 containing various indications for suitable operations in connection with oxy-acetylene work, as exemplified. The member 69, in the present instance, is formed with suitable notches 70 adjacent each indication, and the lever 68 carries a seating member 71 pivoted at 72 and carrying a tooth 73 adapted to fit into the notches. A spring 74 is provided to press the tooth 73 into a notch 70. The scale is suitably marked to indicate various proportional flows and to indicate, for any relative position of the tubes, the total of the flows when the balls are at the same distance from their seats at the bottom of the channels. In the mathematical calculation of the ratio of movement of the tubes, it is to be borne in mind that the output of each tube for a given position of the balls varies directly as the square root of the sine of the angle of inclination, as from the horizontal; provided that such factors as the friction of the balls, for example, are eliminated. If desired, of course, in any particular case, the relative movement of the tubes may be correlated in any one of a variety of ways, as by cams, eccentric gears, or other known means.

Thus, in order to utilize the gauge for hot cutting, for example, the lever 68 is swung about and the tooth 73 is permitted to drop into the notch labeled "hot cutting," whereupon the operator, if he desires a flow of 12 litres per minute, for example, will regulate the valves 61 and 62 in the inlets until the balls 60 in each case are adjacent the line marked 12 on the scale 59, whereupon he is assured that the mixture resulting from the combining of the flow through the two tubes will be the mixture which is proper for hot cutting work. By other adjustments of the lever 68 the tubes may be arranged so that they will indicate a desired flow of gases to form a mixture for cold cutting, heating, low carbon or high carbon welding, smudging, etc. If, for example, the tubes are arranged so that when the tubes are each inclined 26° from the horizontal, and when the balls in each tube are the same distance from their seats, the tube 55 will flow a number of litres of oxygen which is twice the number of litres of acetylene which will flow through the tube 56 in a given time; then, when the balls straddle the 12-litre line, the combined output will be eight litres of oxygen plus four litres of acetylene in a minute (or other period depending on the construction of the tubes), or twelve litres of a 66⅔% oxygen mixture, a useful mixture for melting and heating. If the gear ratio is proper, proper movement of the handle 68 will move the tube 55 to a position wherein it is inclined at an angle of 48° 11' from the horizontal and at the same time will move the tube 56 to a position wherein it is at an angle of 3° and 30' from the horizontal, so that when the indicated members straddle the 12-litre line, for example, the output of the tube 55 will be approximately 10.5 litres, and the output of the tube 56 will be approximately 1.5 litres, so that the total flow in the tubes would be twelve litres of gas in a proportion to yield an eighty-seven and one-half per cent. oxygen mixture, a highly oxidizing lean combustion mixture. Further, if the handle is swung so as to carry the tube 55 to an inclination of 14° 15' from the horizontal, and the tube 56 to an inclination of 80° from the horizontal, the output, with the balls straddling the 12-litre line, will be six litres of oxygen plus six litres of acetylene, i. e., twelve litres of a 50% oxygen mixture, a particularly rich reducing mixture.

It is to be understood that the term "ball" as used herein and in the appended claims is intended to indicate any freely movable indicating element, whether spherical or otherwise shaped, of such nature as to permit movement thereof laterally as well as longitudinally of the gauge tube.

Since certain changes may be made in the above product and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A flow-gauge, comprising a gauge tube, the internal diameter of which increases in the direction of flow, a ball therein, and means to maintain said ball in contact with the wall of said tube during its movement therealong, said means comprising an additional ball in said tube, each of said balls having a diameter less than the internal diameter of said tube and greater than the maximum internal radius thereof.

2. A flow-gauge, comprising a gauge tube, a ball therein, said tube being so formed that the ball may be positioned in accordance with the rate of flow and means to pivotally mount said gauge tube to permit the same to be utilized in a plurality of relative angular positions.

3. A flow-gauge, comprising a gauge tube, a ball therein, said tube being so formed that the ball may be positioned in accordance with the rate of flow, means to pivotally mount said gauge tube to permit the same to be utilized in a plurality of relative positions, and means to indicate a plurality of desired angular positions for said tube.

4. A flow-gauge construction, comprising a plurality of gauge tubes having indicating means therein and being arranged to permit the variation of the relatively angular position of the tubes, means for admitting controlled flow of a plurality of different gases to said plurality of tubes, and means for varying the relative angular position of the tubes.

5. A flow-gauge construction, comprising a plurality of gauge tubes, mounting means for said tubes arranged to permit the variation of the angular position of the tubes to be varied, indicating means in each tube, each of said tubes being so formed that the indicating means may be positioned in accordance with the rate of flow, means to admit controlled flows of different gases to said tubes, and means to adjust the angular position of each tube so that corresponding positions of the indicating means therein will indicate a desired relative and total gas flow for a desired type of work.

6. A flow-gauge construction, comprising a plurality of gauge tubes having indicating means therein, each of said tubes being so formed that the indicating means may be positioned in accordance with the rate of flow, mounting means for said tubes arranged to permit the variation of the angular position of the tubes, means for admitting controlled flows of a plurality of different gases to said plurality of tubes, and means for permitting a desired control of said flows, said latter means including a scale calibrated to indicate a total flow resulting from a given position of the indicating means in each tube when said tubes are at a predetermined relative angular position and including a scale calibrated to indicate a plurality of angular positions for said tubes.

7. A flow-gauge construction, comprising a plurality of gauge tubes, indicating means therein, each of said tubes being so formed that the indicating means is positioned in accordance with the rate of flow, means to pivotally support each of said tubes, means for supplying a plurality of different gases to said plurality of tubes, and means for simultaneously swinging each of said tubes upon its pivot to adjust the angular position of said tubes.

8. A flow-gauge construction, comprising a plurality of gauge tubes, the bore of each of which increases in the direction of flow, a ball in each gauge tube, means to pivotally mount each gauge tube, a scale associated with said gauge tubes to indicate proportionate flows therethrough, means for supplying a plurality of different gases to said plurality of tubes, and means for simultaneously swinging said tubes on their pivots to vary the relative distance of said tubes from the vertical.

9. A flow-gauge construction, comprising a plurality of gauge tubes, the diameter of the bores of each of which increases in the direction of flow, flow responsive indicating means longitudinally movable in each gauge tube, means for pivotally mounting each of said tubes, means for admitting controlled flows of a plurality of different gases to said plurality of tubes, a scale associated with said tubes to indicate proportionate flows therethrough, and means for adjusting the angular position of each tube to facilitate the control of gas flow for a given use of gases.

10. A flow-gauge construction for oxy-acetylene work comprising an oxygen gauge and an acetylene gauge, each of said gauges including a gauge tube, indicating means in each tube, each tube being so formed that the indicating means is positioned therein in accordance with the rate of flow, means to pivotally mount each tube, and means to adjust the angular position of said tubes whereby corresponding positions of the indicating means therein will indicate a desired flow of oxygen and acetylene for a desired type of work.

11. A flow-gauge construction, comprising a pair of gauge tubes, indicating means movable longitudinally therein, each of said tubes being so formed that the indicating means may be positioned therein in accordance with the rate of flow, means to pivotally mount each of said tubes, and means to move one of said tubes toward the vertical when the other is moved toward the horizontal.

12. A flow-gauge construction, comprising a pair of gauge tubes, indicating means movable longitudinally therein, each of said tubes being so formed that the indicating means may be positioned therein in accordance with the rate of flow, means to pivotally mount each of said gauge tubes, and a segmental scale interposed between said tubes to indicate proportionate flows therethrough, and means to cause one of said tubes to be swung upwardly along said scale when the other is depressed.

13. A flow-gauge construction, comprising a pair of gauge tubes, indicating means movable longitudinally therein, each of said tubes being so formed that the indicating means may be positioned therein in accordance with the rate of flow, means to pivotally mount each of said tubes, a connection between said tubes for moving one of said tubes toward the vertical when the other is moved toward the horizontal, means associated with said connection and including a lever for adjusting the position of said tubes, and a scale associated with said lever to indicate proportionate flows through said tubes.

14. A flow-gauge, comprising a tube having a passageway of increasing cross-sectional area in the direction of flow, and a plurality of loose members therein adapted to obstruct the passageway progressively less in the direction of gas-flow.

15. A flow-gauge, comprising a gauge-tube the internal diameter of which increases in the direction of flow, and flow responsive indicating means therein, said indicating means comprising an element contacting one wall of the tube and an element contacting the opposite wall of the tube at all points therealong.

16. A flow-gauge, comprising a gauge-tube the internal diameter of which increases in the direction of flow, and a plurality of balls therein.

17. A flow-gauge, comprising a gauge-tube the internal diameter of which increases in the direction of flow, a ball therein, means to mount said tube for movement through a plurality of angular positions, and a scale associated with said tube and containing indications of a plurality of positions each of which forms an acute angle with the vertical.

18. A flow gauge comprising a gauge tube having internally thereof a circular cross-sectional area, the internal diameter of which increases in the direction of flow, a ball therein of a diameter less than that of any section of said tube, and means serving to maintain the said ball along the wall of the tube, thereby maintaining the coefficient of flow in any given position of the ball constant, whereby a greatly increased accuracy in the indicated readings of said gauge is obtained.

19. A flow gauge comprising a gauge tube, the internal cross-sectional area of which increases in the direction of flow, a ball therein, and means to mount said tube at an angle to the vertical so as to maintain the ball in a substantially straight line along the lower wall of the tube, thereby maintaining the coefficient of flow in any given position of the ball constant, whereby a greatly increased accuracy in the indicated readings of said gauge is obtained.

20. A flow gauge comprising a gauge tube having internally thereof a circular cross-sectional area the internal diameter of which increases in the direction of flow, a ball therein of a diameter less than that of any section of the tube, and a second ball of substantially the same diameter to maintain the first named ball along the wall of the tube, thereby maintaining the coefficient of flow in any given position of the ball constant, whereby a greatly increased accuracy in the indicated readings of said gauge is obtained.

KARL CONNELL.